S. HOLBROOK.
Railway Track-Gage.

No. 168,567.             Patented Oct. 11, 1875.

Witnesses
A. Moore
D. R. Cowl

Inventor
Sylvanus Holbrook
by his attorney
J. L. Norton

UNITED STATES PATENT OFFICE.

SYLVANUS HOLBROOK, OF ROCKPORT, MASSACHUSETTS.

IMPROVEMENT IN RAILWAY-TRACK GAGES.

Specification forming part of Letters Patent No. 168,567, dated October 11, 1875; application filed March 15, 1875.

*To all whom it may concern:*

Figure 1:
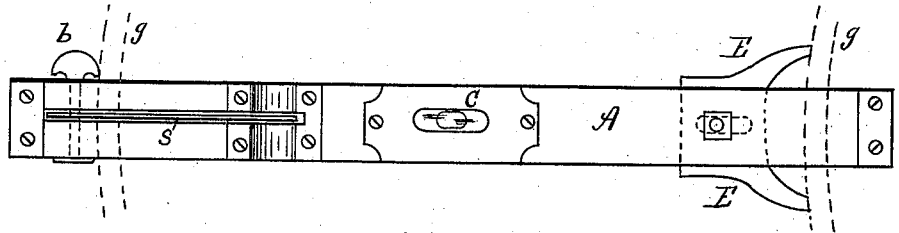
Figure 2:
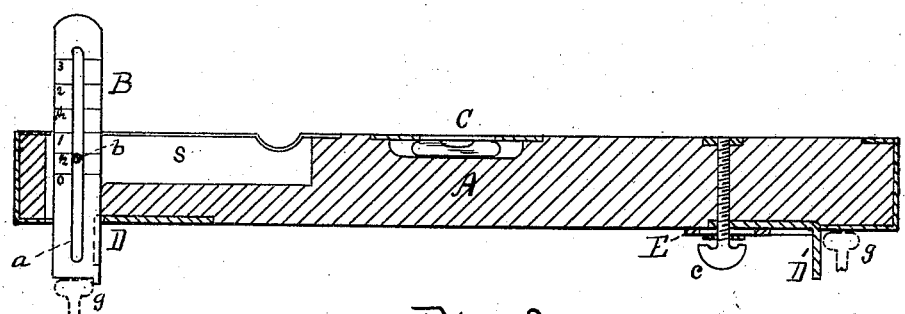

Be it known that I, SYLVANUS HOLBROOK, of Rockport, in the county of Essex and State of Massachusetts, have invented a Railway-Track Gage, of which the following is a specification:

The invention is a combination of several devices constituting a railway-track gage; and consists of the square A, (see Figures 1 and 2 in the accompanying drawing,) which, in length, is a little more than the distance between the two rails, and in size of sufficient thickness for practical purposes. The square has a level, C, in its central part, and is made in the ordinary way, and inclosed in the gage, as shown in said Figs. 1 and 2. The instrument has a sliding adjustable gage, E. (Shown in Fig. 1.) This gage is pronged, and is fastened to the under side of the square A, which is slotted, so that the thumb-screw $c$ (seen in Fig. 2) passes through the square, and is held as shown in said Fig. 2, and the square being slotted lengthwise at this point, the gage E can be moved forward and backward, so as to meet the rail at any desired curve, and then is fastened by the screw $c$. The instrument has also two arms, D and D′, (shown in Fig. 2,) whose outer surfaces touch and measure the distance between the rails. The instrument has, moreover, an adjustable beam, B. (Shown in Figs. 1 and 2.) In Fig. 1 it is resting in a recess, $f$, and in Fig. 2 it is adjusted to the rail, and one end of the square is raised higher than the other, to correspond with the height desired with respect to the curve. The beam is movable on the thumb-screw $b$, which acts as a pivot, as shown in Fig. 1, where the beam rests in the recess $f$; and as shown in Fig. 2, it is tightened, and holds the instrument at any desired height above the rail.

In using the gage E, as before mentioned, if the curve is to be laid sharp, the gage must be moved farther forward, and when both prongs touch the rail it will show that the rails are laid true. If there is no curve the gage is drawn back of the arm D′ and fastened.

In using also the beam B, by loosening the thumb-screw $b$, and taking the beam from the recess $f$, one of its ends is brought down upon the rail and tightened; having a scale upon one side, the height at which the instrument or square A should be above the rail is easily determined, and the track can be laid to correspond.

I am aware that these several devices are not new in themselves; but the grouping, arranging, and combining them in one instrument is novel, and the instrument possesses practical convenience and utility; and

What I claim as my invention, and desire to secure by Letters Patent, is—

The combination and arrangement of the square A, having a recess, $f$, for the beam B when not in use, the projecting arms D D, the beam B, the thumb-screw $b$, by which the square A is adjusted onto the beam B as to height above the rail, said screw also operating as a pivot to the beam B when laid at rest in the recess $f$, the level C and the forked gage E having a slot therein, and an adjusting thumb-screw, $c$, by which said gage E is held to the square A, and may be moved backward and forward, substantially as shown, and for the purpose described.

SYLVANUS HOLBROOK.

Witnesses:
HOWARD A. SAVILLE,
J. L. NEWTON.